UNITED STATES PATENT OFFICE.

LOUIS LAWRENCE AND HARRY A. STEELE, OF NEWARK, NEW JERSEY.

PLASTIC COMPOSITION.

1,235,819.
Specification of Letters Patent.
Patented Aug. 7, 1917.

No Drawing.
Application filed June 9, 1916. Serial No. 102,656.

*To all whom it may concern:*

Be it known that we, LOUIS LAWRENCE and HARRY A. STEELE, both citizens of the United States, residing at Newark, in the county of Essex, State of New Jersey, have invented an Improved Plastic Composition, of which the following is a specification.

Our present invention relates to a composition of material and the object thereof is a provision of a cheaply manufactured material which may be used as a substitute for wood, hard rubber, and various plastic compositions now employed in numerous arts.

In carrying out our invention we employ a mixture of brown shellac, china clay, commercial asbestos cement, Indian red and ground leather in predetermined proportions which when mixed form a plastic mass that may be molded into any desired form and which by adding to it another suitable coloring material in addition to the Indian red may be made into an article of any desired tint.

The proportions in which these materials are employed is substantially as follows:—

2½ parts of brown shellac,
5 parts of China clay,
6 parts of commercial asbestos cement,
1 part of Indian red, and
2 parts of ground leather.

As hereinbefore stated it is found that a composition of material made of the hereinbefore specified ingredients when mixed is a plastic mass which may be placed in the necessary mold to form any desired article. The mass when molded dries and sets in a comparatively short time so that it may be quickly removed from the mold and the resultant material is so hard as to be substantially unbreakable. After coming from the mold the surface of the article formed may be polished or otherwise finished to suit the requirements of use to which the article is put or the fancy of the user.

As will be apparent from the foregoing this composition of material may be used as a substitute for wood; it may be used for statues, ornaments and various other articles commonly made of ordinary plastic material; may be used for buttons employed on clothing; may be used as a substitute for insulating material in the electrical arts; and in fact the use to which this material may be put is substantially unlimited.

We claim as our invention:

1. A plastic composition consisting of shellac, clay, Indian red, ground leather, and a binder, substantially as described.

2. A plastic composition consisting of shellac, clay, Indian red, ground leather, and a cement as a binding material substantially as described.

3. A plastic composition consisting of brown shellac, china clay, commercial asbestos cement, Indian red, and ground leather substantially as described.

4. A plastic composition consisting of brown shellac, china clay, commercial asbestos cement, Indian red, ground leather, and another coloring material in addition to the Indian red substantially as described.

5. A plastic composition consisting of two and one half parts of brown shellac, five parts of china clay, six parts of commercial asbestos cement, one part of Indian red, and two parts of ground leather.

Signed by us this 20 day of May, 1916.

LOUIS LAWRENCE.
HARRY A. STEELE.